US012665413B2

(12) United States Patent
Meisinger, Sr. et al.

(10) Patent No.: US 12,665,413 B2
(45) Date of Patent: Jun. 23, 2026

(54) LATERAL FAULT ISOLATION

(71) Applicant: S&C Electric Company, Chicago, IL (US)

(72) Inventors: Michael John Meisinger, Sr., Chicago, IL (US); Richard Thomas Gray, Orthbrook, IL (US); Michael J. Higginson, Mount Prospect, IL (US); Martin T. Bishop, Oak Creek, WI (US)

(73) Assignee: S&C Electric Company, Chicago, IL (US)

( * ) Notice: Subject to any disclaimer, the term of this patent is extended or adjusted under 35 U.S.C. 154(b) by 148 days.

(21) Appl. No.: 18/910,292

(22) Filed: Oct. 9, 2024

(65) Prior Publication Data

US 2025/0118959 A1     Apr. 10, 2025

Related U.S. Application Data

(60) Provisional application No. 63/588,845, filed on Oct. 9, 2023.

(51) Int. Cl.
H02H 7/26 (2006.01)
H02H 1/00 (2006.01)
H02H 3/08 (2006.01)

(52) U.S. Cl.
CPC ........... H02H 7/26 (2013.01); H02H 1/0007 (2013.01); H02H 3/083 (2013.01)

(58) Field of Classification Search
CPC ............ H02H 7/10; H02H 7/106; H02H 7/12; H02H 7/213; H02H 7/216; H02H 7/122;
H02H 7/1222; H02H 7/1225; H02H 7/1227; H02H 7/125; H02H 7/1252; H02H 7/1255; H02H 7/1257; H02H 3/20; H02H 3/08; H02H 3/083; H02H 3/202; H02H 3/207; H02H 3/24; H02H 3/243; H02H 3/26;

(Continued)

(56) References Cited

U.S. PATENT DOCUMENTS

| | | | | |
|---|---|---|---|---|
| 6,667,866 B1 * | 12/2003 | LaPlace | ................. | H02H 3/063 |
| | | | | 361/87 |
| 11,728,638 B2 * | 8/2023 | Meisinger, Sr. | ......... | H02H 3/06 |
| | | | | 361/63 |
| 12,266,925 B2 * | 4/2025 | Meisinger, Sr. | ......... | H02H 3/06 |

(Continued)

OTHER PUBLICATIONS

International Search Report and Written Opinion for International Application No. PCT/US2024/50430 dated Dec. 10, 2024. (15 pages).

*Primary Examiner* — Jeffrey A Gblende

(57) ABSTRACT
A system and method for providing fault isolation in a power distribution network. The network includes a power line, a recloser coupled to the power line and a plurality of switching devices coupled to the power line downstream of the recloser, where each switching device is capable of detecting fault current in response to the fault and detecting presence of voltage. In one non-limiting embodiment, the method includes detecting overcurrent, loss of voltage and return of voltage by the switching devices and includes sequentially opening and closing switching devices from the recloser to a switching device immediately upstream of the fault in response to detecting overcurrent, loss of voltage and return of voltage.

19 Claims, 2 Drawing Sheets

(58) Field of Classification Search
    CPC ........ H02H 3/265; H02H 3/28; H02H 1/0007;
                                                    H02H 1/04
    See application file for complete search history.

(56)                          References Cited

U.S. PATENT DOCUMENTS

| | | | |
|---|---|---|---|
| 2008/0316664 A1 | 12/2008 | Premerlani et al. | |
| 2009/0290275 A1* | 11/2009 | Staszesky ................ | H02H 7/30 |
| | | | 361/63 |
| 2019/0245342 A1 | 8/2019 | Sharon | |
| 2020/0076183 A1 | 3/2020 | Montenegro et al. | |
| 2022/0102973 A1* | 3/2022 | Quinlan .................. | H02H 3/06 |
| 2022/0416539 A1 | 12/2022 | Porter et al. | |
| 2023/0052174 A1 | 2/2023 | Meisinger, Sr. et al. | |

* cited by examiner

LATERAL FAULT ISOLATION

CROSS-REFERENCE TO RELATED APPLICATION

This application claims the benefit of priority from the U.S. Provisional Application No. 63/588,845, filed on Oct. 9, 2023, the disclosure of which is hereby expressly incorporated herein by reference for all purposes.

BACKGROUND

Field

The present disclosure relates generally to a system and method for providing fault isolation in a power distribution network.

Discussion of the Related Art

An electrical power distribution network, often referred to as an electrical grid, typically includes power generation plants each having power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to substations typically located within a community, where the voltage is stepped down to a medium voltage for distribution. The substations provide the medium voltage power to three-phase feeders including three single-phase feeder lines that carry the same current, but are 120° apart in phase. three-phase and/or single phase lateral lines are tapped off of the feeder that provide the medium voltage to various distribution transformers, where the voltage is stepped down to a low voltage and is provided to loads, such as homes, businesses, etc.

Periodically, faults occur in the distribution network from things, such as animals touching the lines, lightning strikes, tree branches falling on the lines, vehicle collisions with utility poles, etc. Faults may create a short-circuit that increases the stress on the network, which may cause the current flow to significantly increase, for example, many times above the normal current, along the fault path. This amount of current causes the electrical lines to significantly heat up and possibly melt, and also could cause mechanical damage to various components in the network. These faults are often transient or intermittent faults as opposed to a persistent or bolted fault, where the thing that caused the fault is removed a short time after the fault occurs, for example, a lightning strike. In such cases, the distribution network will almost immediately begin operating normally after a brief disconnection from the source of power.

Traditionally, a fuse is installed as a primary overload protection device for distribution transformers and other devices, and the type and rating is selected so that the fuse will not operate for normally expected current magnitudes, such as transformer inrush current, but operates at faster times compared to the transformer through fault protection withstand or damage curve. However, expulsion fuses often create byproducts when they operate, which has obvious drawbacks in some circumstances.

Reclosers and other related fault interrupting devices are often applied by distribution engineers as protection devices on utility poles and other locations. These reclosers typically detect the current and/or voltage on the line to monitor current flow and have controls that indicate problems with the network circuit, such as detecting a high current fault event. If such a high fault current is detected the recloser is opened in response thereto, and then after a short delay is closed to determine whether the fault is a transient fault. If high fault current flows when the recloser is closed after opening, it is immediately re-opened. If the fault current is detected a second time, or multiple times, during subsequent opening and closing operations indicating a persistent fault, then the recloser remains open and it may drop out of its mounting or provide another form of indication that it is locked open, where the time between detection tests may increase after each test.

When a fault is detected, it is desirable that the first fault interrupting device upstream from the fault be opened as soon as possible so that the fault is quickly removed from the network to prevent damage to equipment, personal injury, fires, etc., and so that the loads upstream of that fault interrupting device are not disconnected from the power source and service is not interrupted to them. It is further desirable that if the first fault interrupting device upstream from the fault does not open for whatever reason, then a next fault interrupting device upstream from the fault is opened, and so on. In order to accomplish this, it is necessary that some type of communications or coordination protection scheme be employed in the network so that the desired fault interrupting device is opened in response to the fault.

One known protection scheme for this purpose is referred to in the art as a time-current characteristic (TCC) curve coordination scheme. Generally, for a TCC coordination scheme each fault interrupting device in a particular series of fault interrupting devices is assigned a TCC curve that defines how fast the fault interrupting device will open in response to detected current, where the TCC curve timing value is longer for lower currents and is shorter for higher currents, and where the settings entered into the specific recloser control defines the TCC curve. Devices with dual TCC curves (fast and slow) are typically used in systems where protection consists of both fuses and relayed fault interrupting devices and/or reclosers. In systems without fuses a single TCC curve is more commonly used. As the fault interrupting devices are provided farther downstream from the source, they are typically configured with faster TCC curves so that the first upstream fault interrupting device from a detected fault will open before a next up stream interrupting device from the fault, where the particular fault interrupting device will stop timing on its TCC curve once a downstream fault interrupting device opens and the fault is removed. However, traditional TCC coordination schemes are limited in the number of fault interrupting devices a feeder can have because the TCC curves cannot be too close together in order for the coordination to be effective. In other words, the number of TCC curves that realistically can be applied is limited. Moreover, when multiple fault interrupting devices are applied on a feeder the devices that are installed closer to the source need to operate relatively slowly in order to properly coordinate with the multiple downline devices.

SUMMARY

The following discussion discloses and describes a system and method for isolating a fault in a power distribution network. The network includes a power line, a recloser coupled to the power line and a plurality of switching devices coupled to the power line downstream of the recloser, where each switching device is capable of detecting fault current in response to the fault and detecting presence of voltage. The method includes detecting overcurrent in the network due to the fault by the recloser and all of the switching devices positioned along a fault path between the recloser and the fault location, interrupting the overcurrent by opening the recloser based on an initial trip profile TCC curve, and detecting loss of voltage or absence of current when the recloser opens by the switching devices along the fault path. The method further includes recording a fault count by each switching device that detected overcurrent and then loss of voltage or the absence of current, opening each switching device that recorded a predetermined number of fault counts, and changing the initial trip profile TCC curve of the recloser to an operational trip profile TCC curve that is slower than the initial trip profile TCC curve and is coordinated with fault interrupting trip profile TCC curves of the switching devices along the fault path when the recloser opens and the predetermined number of fault counts has been reached. The method also includes closing a first switching device downstream of the recloser after a prede- termined closing time period when the recloser closes, activating a fault interrupting trip profile TCC curve of the first switching device during a wait time before the prede- termined closing time period has ended, and closing a next switching device downstream of the first switching device after the predetermined closing time period when the first switching device closes. The method additionally includes activating a fault interrupting trip profile TCC curve of the next switching device during a wait time before the prede- termined closing time period has ended, deactivating the fault interrupting trip profile TCC curve of the first switching device before the next switching device closes, and sequen- tially closing switching devices along the fault path until a switching device immediately upstream of the fault closes and detects overcurrent from the fault and then opens due to its fast TCC curve, where that switching device remains open.

Additional features of the disclosure will become appar- ent from the following description and appended claims, taken in conjunction with the accompanying drawings.

DETAILED DESCRIPTION OF THE EMBODIMENTS

The following discussion of the embodiments of the disclosure directed to a system and method for providing fault isolation in a power distribution network, where the method includes sequentially opening and closing line switching devices installed downstream of a recloser result- ing in the opening of only the switching device immediately upstream of the fault in response to detecting overcurrent, loss of voltage and return of voltage is merely exemplary in nature, and is in no way intended to limit the invention or its applications or uses.

Figure 1:
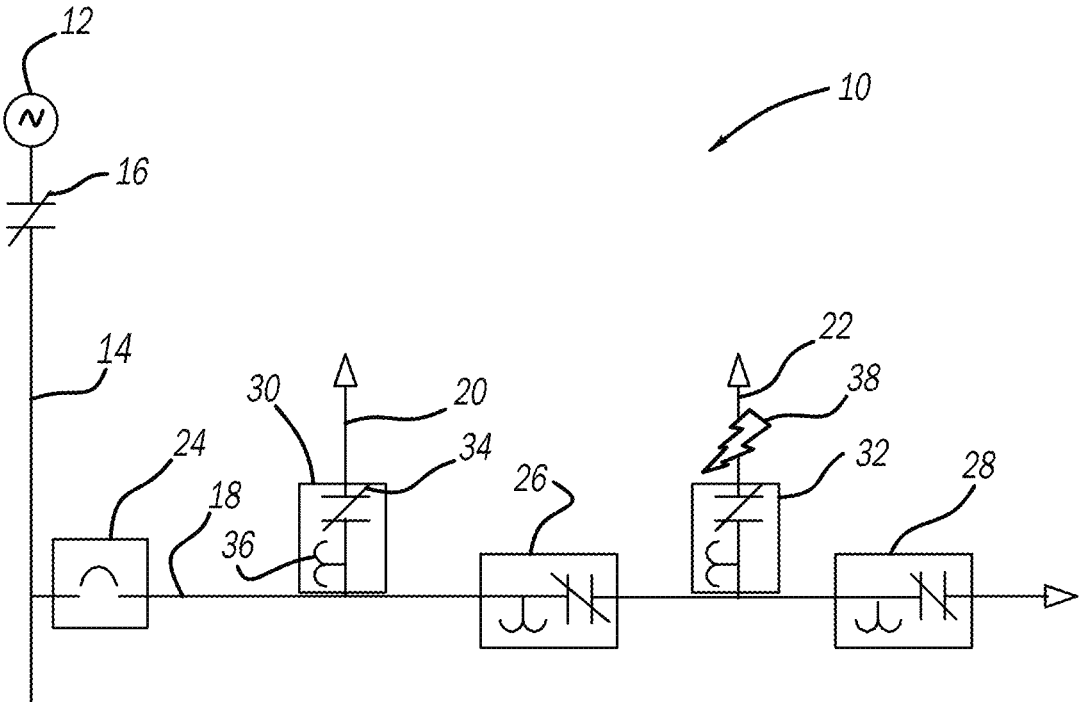
FIG. 1 is a simplified schematic type diagram of an electrical power distribution network including fault inter- rupting devices.

FIG. 1 is a simplified schematic type diagram of an electrical power distribution network 10. The network 10 includes a source 12 of AC power, such as a substation, that provides power on a three-phase feeder 14, where a circuit breaker 16 is provided on the feeder 14 proximate the source 12. A single-phase main lateral 18 is served by the feeder 14 and single-phase sub-laterals 20 and 22 are served by the lateral 18. In other embodiments, the laterals 18, 20 and 22 could be two-phase or three-phase laterals. A recloser 24 is provided on the lateral 18 proximate the location of con- nection to the feeder 14. A fault sectionalizer 26 is provided on the lateral 18 between the sub-laterals 20 and 22, a fault sectionalizer 28 is provided on the lateral 18 downstream from the sub-lateral 22, a fault sectionalizer 30 is provided on the sub-lateral 20 proximate the location of connection to the lateral 18, and a fault sectionalizer 32 is provided on the sub-lateral 22 proximate the location of connection to the lateral 18, where the sectionalizers 26-32 include contacts 34 and a suitable device 36 for detecting loss and return of voltage. The recloser 24 and the sectionalizers 26-32 are shown in their closed position.

This disclosure proposes a fault isolation scheme for a power distribution network. If a fault 38 occurs, for example, on the sub-lateral 22, the protection scheme will operate so that sectionalizer 32 will open removing power to the loads served by the sub-lateral 22, but power will be maintained to the rest of the network 10. The recloser 24 has reclosing capabilities, but the sectionalizers 26-32, while designed and built to close into a fault, do not function in the same manner as the recloser 24. The fault sectionalizers 26-32 are capable of identifying a fault event by detecting overcurrent followed by loss-of-voltage or absence of cur- rent as a result of the recloser 24 opening in a reclosing operation to clear the fault, whereas the sectionalizers 26-32 record each fault event as a fault count. Each sectionalizer 26-32 is programmed to open its contacts 34 if it records a predetermined number of fault counts after a certain delay. Each sectionalizer 26-32 is also programmed to open after a certain number of fault counts that would be less than the number of overcurrent detections by the recloser 24 so that all of the sectionalizers upstream of the fault and down- stream of the recloser in the fault current path would open before the recloser 24 locks open. The sectionalizers 26-32 are capable of detecting or measuring current, but are not required to measure voltage, just determine the presence of voltage in the specific embodiment being discussed. In other embodiments, the sectionalizers 26-32 may operate in the manner discussed herein by only detecting overcurrent and current absence and not the presence of voltage.

Figure 2:
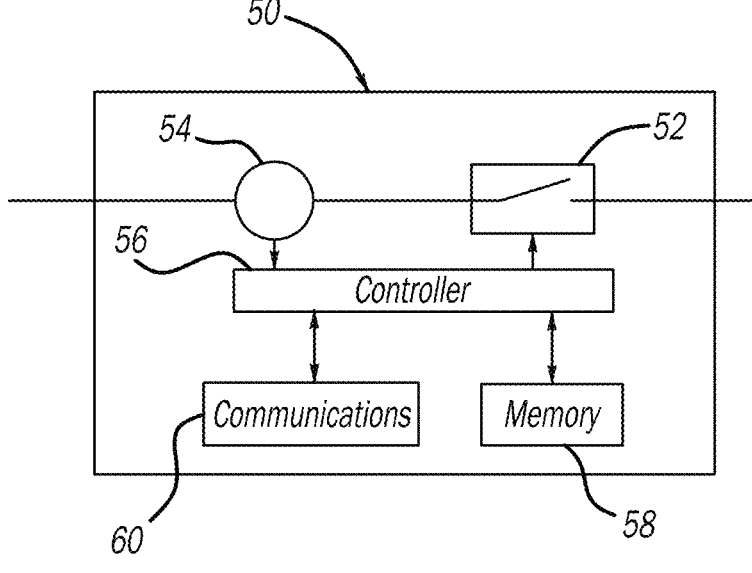
FIG. 2 is a simplified schematic block diagram of a fault interrupting device.

FIG. 2 is a simplified schematic block diagram of a fault interrupting device 50 intended to be a non-limiting general representation of either the recloser 24 or one of the fault sectionalizers 26-32. The device 50 includes a switch 52, for example, a vacuum interrupter, voltage/current sensors 54, a controller 56, a memory 58, and an optional communica- tions device 60, for example, a cellular radio or other communications technology device, where the memory 58 stores executable code to perform the various calculations and operations discussed herein.

Figure 3:
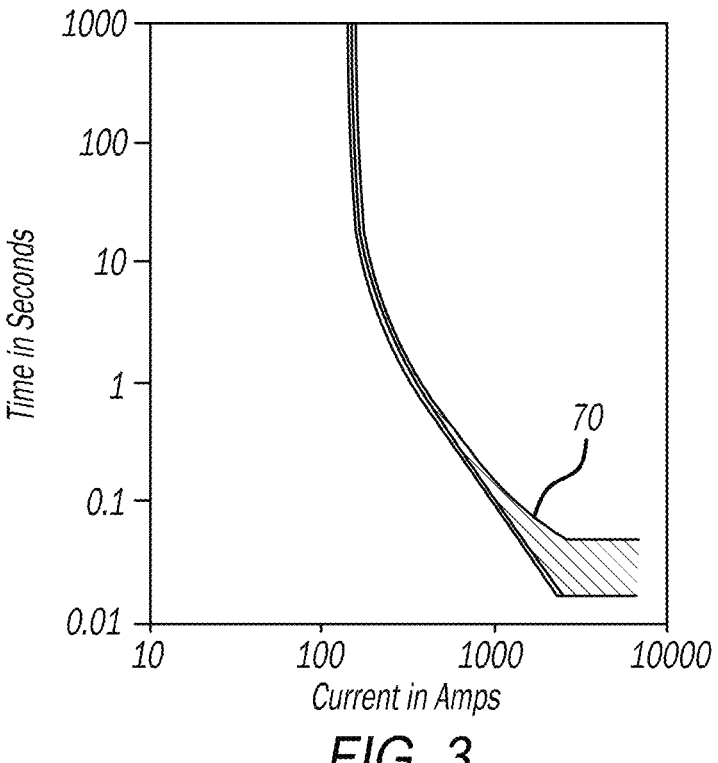
FIG. 3 is a logarithmic graph with current in amps on the horizontal axis and time in seconds on the vertical axis showing an initial trip profile TCC curve for the recloser shown in FIG. 1.

FIG. 3 is a logarithmic graph with current in amps on the horizontal axis and time in seconds on the vertical axis showing an initial trip profile TCC curve 70 for the recloser 24. The curve 70 has a certain width where a left side of the curve 70 is the minimum trip time of the recloser 24 and the right side of the curve 70 is the maximum clearing time of the recloser 24 when all tolerances are applied. As will be discussed in detail below, when the recloser 24 trips open in response to detecting fault current based on the TCC curve 70, it will then change its TCC curve tripping profile so that it is coordinated with the downstream sectionalizers 26-32 to allow the sectionalizers 26-32 to clear the fault before the recloser 24 operates again.

Figure 4:
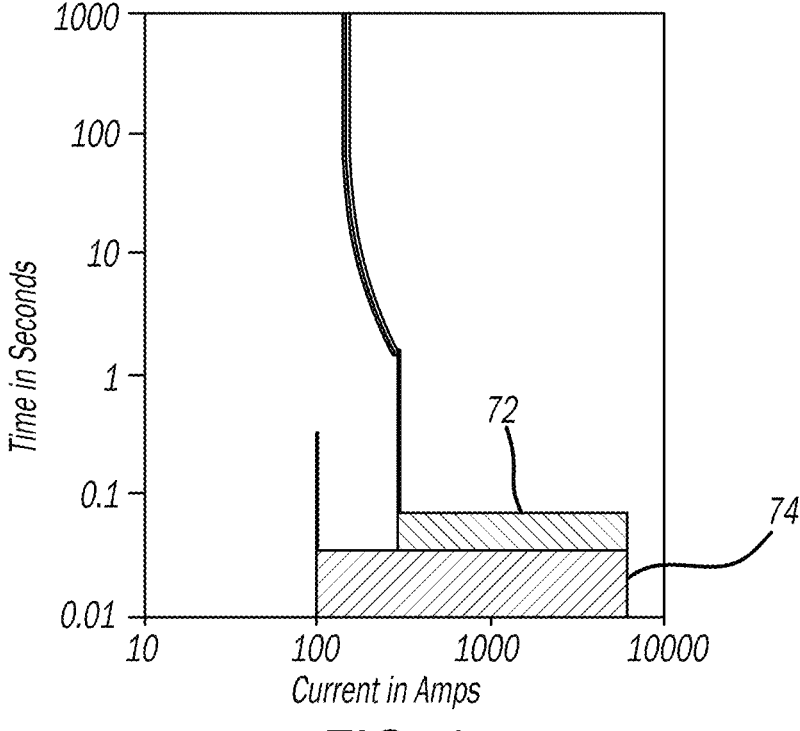
FIG. 4 is a logarithmic graph with current in amps on the horizontal axis and time in seconds on the vertical axis showing an alternate operating trip profile TCC curve for the recloser shown in FIG. 1 and a fault interrupting trip profile TCC curve for the sectionalizers shown in FIG. 1.

FIG. 4 is a logarithmic graph with current in amps on the horizontal axis and time in seconds on the vertical axis showing an example of an operational trip profile TCC curve 72 for the recloser 24 and the sectionalizers 26-32 after the fault 38 is detected and interrupted by the recloser 24, where the TCC curve 72 replaces the TCC curve 70 for the recloser 24 and a fault interrupting trip profile TCC curve 74 is used by all of the sectionalizers along the fault path. As is apparent from FIG. 4, the sectionalizers 26-32 will operate before the recloser 24, and thus the recloser 24 will only open and close one time for any fault downstream of any of the sectionalizers 26-32.

When the fault 38 occurs on the sub-lateral 22 downstream of the sectionalizer 32, the recloser 24 and the sectionalizers 26 and 32 along the fault current path detect the overcurrent and the recloser 24 trips open based on the initial trip profile TCC curve 70, thus removing voltage on the lateral 18. The sectionalizers 26 and 32 record a fault count because they detected overcurrent followed by loss of voltage when the recloser 24 opens. Alternately, as mentioned above, the sectionalizers 26 and 32 may not be capable of detecting voltage and instead will register a fault count by detected overcurrent followed by absence of current when the recloser 24 opens. The sectionalizers 28 and 30 are not on the fault current path, so they do not detect sufficient overcurrent, and thus do not record a fault count when they lose voltage. In this example, the sectionalizers 26 and 32 are programmed to open on a fault count of 1, so they would both open after the recloser 24 opens. The recloser 24 changes to the TCC curve 72 when it is open to be coordinated with the TCC curve 74 for the sectionalizers 26 and 32 when they operate as fault interrupting devices while it is open, as discussed below.

The recloser 24 then closes and provides voltage on the lateral 18, which is detected by the sectionalizer 26, and which provides power to loads along the lateral 18 upstream of the sectionalizer 26 and on the sub-lateral 20. When the recloser 24 closes and the sectionalizer 26 detects return of voltage, the sectionalizer 26 prepares to close after a predetermined time period, for example, forty-five seconds. The sectionalizer 26 operates as a fault interrupting device with the trip profile TCC curve 74 during this wait time to close. When the sectionalizer 26 closes when the wait time expires, the sectionalizer 32 detects return of voltage and prepares to close when it's predetermined time period has expired. The sectionalizer 26 does not observe any fault current upon reclosing since the fault 38 is downstream of the sectionalizer 32 that is still in the open state. The sectionalizer 32 is now operating as a fault interrupting device with the trip profile TCC curve 74. However, when the sectionalizer 26 does not detect fault current for a predetermined time interval, the trip profile TCC curve 74 for the sectionalizer 26 is deactivated before the sectionalizer 32 closes to reduce the number of fault interrupting devices along the fault path that require time-current coordination. After the predetermined period of time, the sectionalizer 32 closes and it detects overcurrent from the fault 38 and opens again. The sectionalizer 32 may close on the fault 38 and reopen in a reclosing operation a predetermined number of times, and then may drop out of its cut-out mounting to provide a visual indication that it has opened to clear the fault 38. If the sectionalizers 26 and 32 are not able to detect voltage, they may be programmed to close at the end of the predetermined wait time without detecting the return of voltage.

After a predetermined period of time that the recloser 24 does not detect overcurrent, it will reset to the trip profile TCC curve 70. If there were other sectionalizers along the fault path between the sectionalizers 26 and 32, then they would operate in a sequential manner from upstream to downstream as the sectionalizer 26 did as discussed above. In other words, each sectionalizer upstream of the sectionalizer 32 would detect voltage and no overcurrent, and temporarily operate as a fault interrupting device.

Because only one sectionalizer is operating as a fault interrupting device with the fault interrupting trip profile TCC curve 74 at a particular point in time during the fault clearing operation, more sectionalizers can be provided along a given fault path than was previously possible.

A second fault clearing method is disclosed that uses fault making instead of fault interrupting as described above. In this method, and using the example discussed above, the sequential closing of the fault sectionalizers 26 and 32 along the fault path that opened when their fault count was reached would rely on the recloser 24 to interrupt the fault current after the sectionalizer 32 immediately upstream of the fault 38 closed on the fault instead of the sectionalizers 26 and 32 operating as fault interrupting devices. In this method, the recloser 24 does not switch from the TCC curve 70 to the TCC curve 72 when it operates the first time and the sectionalizers 26 and 32 do not use the TCC curve 74.

More particularly, the sectionalizers 26 and 32 would open when their fault count is reached in the same manner described above. When the recloser 24 then recloses, the sectionalizer 26 detects the return of voltage and closes, but does not detect overcurrent, and no further action is taken by the sectionalizer 26. When the sectionalizer 26 closes, the sectionalizer 32 detects the return of voltage and closes, and this action re-establishes a detectable overcurrent from the fault 38, so the control logic would indicate that it must be the first sectionalizer upstream of the fault 38. However, instead of the sectionalizer 32 opening in response to detecting the overcurrent, it remains closed and the recloser 24 detects the overcurrent and opens a second time using its normal TCC curve 70. Since the logic of the sectionalizer 32 concludes that it closed onto the fault 38, it opens, or drops out, after detecting loss of voltage resulting from the recloser 24 opening a second time. The recloser 24 recloses a second time and since the sectionalizer 26 remained closed and the sectionalizer 32 is open, or dropped out, the recloser 24 doesn't detect fault current and remains closed. If another reclosing operation is desired, then the sectionalizer 32 could close when it detects return of voltage the second time, where the recloser 24 would detect overcurrent again and open, and then reclose again. Also, if the sectionalizers were operating on a higher fault count, then the recloser 24 would open the number of times required by that count.

The main benefit of the second method over the first method is that the TCC curve coordination between the recloser 24 and the downstream fault sectionalizers is not required. The recloser 24 would trip and reclose a minimum of two times before a sectionalizer isolated a permanent fault and un-faulted lateral sections were re-energized. Temporary faults that clear after one recloser operation would produce one closing operation of the sectionalizer 26 and 32.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for isolating a fault in a power distribution network, the network including a power line, a recloser coupled to the power line and a plurality of switching devices coupled to the power line downstream of the recloser, each switching device being capable of detecting fault current in response to the fault and detecting presence of voltage, the method comprising:

detecting overcurrent in the network from the fault by the recloser and all of the switching devices positioned along a fault path between the recloser and the fault;

interrupting the overcurrent by opening the recloser based on an initial trip profile time-current characteristic (TCC) curve;

detecting loss of voltage and/or absence of current when the recloser opens by the switching devices along the fault path;

recording a fault count by each switching device that detected overcurrent and then the loss of voltage and/or the absence of current;

opening each switching device that recorded a predetermined number of fault counts;

changing the initial trip profile TCC curve of the recloser to an operational trip profile TCC curve that is slower than the initial trip profile TCC curve and is coordinated with fault interrupting trip profile TCC curves of the switching devices along the fault path when the recloser opens and the predetermined number of fault counts has been reached;

closing the recloser;

closing a first switching device downstream of the recloser after a predetermined closing time period when the recloser closes;

activating a fault interrupting trip profile TCC curve of the first switching device during a wait time before the predetermined closing time period has ended;

closing a next switching device downstream of the first switching device after the predetermined closing time period when the first switching device closes;

activating a fault interrupting trip profile TCC curve of the next switching device during a wait time before the predetermined closing time period has ended;

deactivating the fault interrupting trip profile TCC curve of the first switching device before the next switching device closes; and sequentially closing switching devices along the fault path until a switching device immediately upstream of the fault closes and detects overcurrent from the fault, where that switching device remains open.

2. The method according to claim 1 wherein closing a first switching device downstream of the recloser, closing a next switching device downstream of the first switching device and sequentially closing next switching devices also include detecting return of voltage.

3. The method according to claim 1 wherein the switching device immediately upstream of the fault closes and opens a plurality of times before the switching device immediately upstream of the fault remains open.

4. The method according to claim 3 wherein the switching device immediately upstream of the fault drops out of a cut-out mounting when the switching device immediately upstream of the fault remains open.

5. The method according to claim 1 wherein the switching devices include vacuum interrupters.

6. The method according to claim 1 wherein the power line is a single-phase lateral line coupled to a three-phase feeder.

7. The method according to claim 1 wherein the fault interrupting trip profile TCC curve of all of the switching devices is the same.

8. The method according to claim 1 further comprising returning the recloser to the initial trip profile TCC curve after a certain time period that the recloser does not detect overcurrent.

9. A method for isolating a fault in a power distribution network, the network including a power line, a recloser coupled to the power line and a plurality of switching devices coupled to the power line downstream of the recloser, each switching device being capable of detecting fault current in response to the fault and detecting presence of voltage, the method comprising:

detecting overcurrent in the network from the fault by the recloser and all of the switching devices positioned along a fault path between the recloser and the fault;

interrupting the overcurrent by opening the recloser;

detecting loss of voltage and/or absence of current when the recloser opens by the switching devices along the fault path;

recording a fault count by each switching device that detected overcurrent and then the loss of voltage and/or the absence of current;

opening each switching device that recorded a predetermined number of fault counts;

closing the recloser;

closing a first switching device downstream of the recloser after a predetermined closing time period when the recloser closes;

closing a next switching device downstream of the first switching device after the predetermined closing time period when the first switching device closes; and sequentially closing next switching devices along the fault path until a switching device immediately upstream of the fault closes and detects overcurrent from the fault, where that switching device remains open.

10. The method according to claim 9 wherein closing a first switching device downstream of the recloser, closing a next switching device downstream of the first switching device and sequentially closing next switching devices also include detecting return of voltage.

11. The method according to claim 9 wherein interrupting the overcurrent by opening the recloser includes using an initial trip profile time-current characteristic (TCC) curve.

12. The method according to claim 11 further comprising changing the initial trip profile TCC curve of the recloser to an operational trip profile TCC curve that is slower than the initial trip profile TCC curve and is coordinated with fault interrupting trip profile TCC curves of the switching devices along the fault path when the recloser opens and the predetermined number of fault counts has been reached.

13. The method according to claim 12 further comprising activating a fault interrupting trip profile TCC curve of the first switching device that detected return of voltage during a wait time before the predetermined closing time period has ended.

14. The method according to claim 13 further comprising activating a fault interrupting trip profile TCC curve of the next switching device that detected return of voltage during a wait time before the predetermined closing time period has ended.

15. The method according to claim 14 further comprising deactivating the fault interrupting trip profile TCC curve of the first switching device that detected return of voltage before the next switching device closes.

16. The method according to claim 11 further comprising returning the recloser to the initial trip profile TCC curve after a certain time period that the recloser does not detect overcurrent.

17. A method for isolating a fault in a power distribution network, the network including a power line, a recloser coupled to the power line and a plurality of switching devices coupled to the power line downstream of the recloser, each switching device being capable of detecting fault current in response to the fault and detecting presence of voltage, the method comprising:

detecting overcurrent in the network from the fault by the recloser and all of the switching devices positioned along a fault path between the recloser and the fault;

interrupting the overcurrent by opening the recloser;

detecting loss of voltage and/or absence of current when the recloser opens by the switching devices along the fault path;

recording a fault count by each switching device that detected overcurrent and then the loss of voltage and/or the absence of current;

opening each switching device that recorded a predetermined number of fault counts;

closing the recloser;

closing a first switching device downstream of the recloser after a predetermined closing time period when the recloser closes;

closing a next switching device downstream of the first switching device after the predetermined closing time period when the first switching device closes;

sequentially closing next switching devices along the fault path until a switching device immediately upstream of the fault closes and causes overcurrent on the fault path;

interrupting the overcurrent again by opening the recloser;

opening the switching device immediately upstream of the fault; and again closing the recloser.

18. The method according to claim 17 wherein closing a first switching device downstream of the recloser, closing a next switching device downstream of the first switching device and sequentially closing next switching devices also include detecting return of voltage.

19. The method according to claim 17 wherein the switching device immediately upstream of the fault drops out of a cut-out mounting when the switching device immediately upstream of the fault remains open.

* * * * *